United States Patent

Shoji

(10) Patent No.: US 7,392,704 B2
(45) Date of Patent: Jul. 1, 2008

(54) ACCELERATION SENSOR AND MAGNETIC DISK DRIVE APPARATUS

(75) Inventor: Shigeru Shoji, Chuo-ku (JP)

(73) Assignee: TDK Corporation, Chuo-Ku, Tokyo (JP)

( * ) Notice: Subject to any disclaimer, the term of this patent is extended or adjusted under 35 U.S.C. 154(b) by 78 days.

(21) Appl. No.: 11/453,090

(22) Filed: Jun. 15, 2006

(65) Prior Publication Data

US 2007/0017290 A1  Jan. 25, 2007

(30) Foreign Application Priority Data

Jul. 21, 2005  (JP) ............................. 2005-211166

(51) Int. Cl.
*G01P 15/11* (2006.01)

(52) U.S. Cl. .................................. 73/514.31

(58) Field of Classification Search .............. 73/514.31; 324/207.21
See application file for complete search history.

(56) References Cited

U.S. PATENT DOCUMENTS

| | | | |
|---|---|---|---|
| 4,967,598 A * | 11/1990 | Wakatsuki et al. | ....... 73/514.12 |
| 5,747,991 A | 5/1998 | Ito et al. | |
| 6,131,457 A | 10/2000 | Sato | |
| 6,507,187 B1 * | 1/2003 | Olivas et al. | ........... 324/207.21 |
| 6,577,124 B2 * | 6/2003 | Coehoorn et al. | ........... 324/252 |
| 2006/0101911 A1 | 5/2006 | Shoji | |

FOREIGN PATENT DOCUMENTS

JP   2-248867   10/1990

OTHER PUBLICATIONS

U.S. Appl. No. 11/414,301, filed May 1, 2006, Shoji.
U.S. Appl. No. 11/482,796, filed Jul. 10, 2006, Shoji.
U.S. Appl. No. 11/483,099, filed Jul. 10, 2006, Shoji.
U.S. Appl. No. 11/549,820, filed Oct. 16, 2006, Shoji.
U.S. Appl. No. 11/549,768, filed Oct. 16, 2006, Shoji.

* cited by examiner

*Primary Examiner*—John E Chapman
(74) *Attorney, Agent, or Firm*—Frommer Lawrence & Haug LLP

(57) ABSTRACT

An acceleration sensor includes a housing member, a spring member attached to the housing member and provided with freedom in at least one direction of acceleration to be detected, a magnetic field generation member with weight fixed to the spring member, and at least one magnetic field detection sensor attached to the housing member to face the magnetic field generation member with weight. Each magnetic field detection sensor is provided with at least one pair of multi-layered MR elements each including a magnetization fixed layer and a magnetization free layer. A magnetized direction of the magnetization fixed layers is fixed to a direction parallel to the direction of acceleration to be detected. The magnetic field generation member with weight includes at least one permanent magnet that provides a closed magnetic loop. At least one pair of multi-layered MR elements is arranged in the closed magnetic loop to receive magnetic field substantially perpendicular to a lamination plane of the multi-layered MR elements when no acceleration is applied.

19 Claims, 13 Drawing Sheets

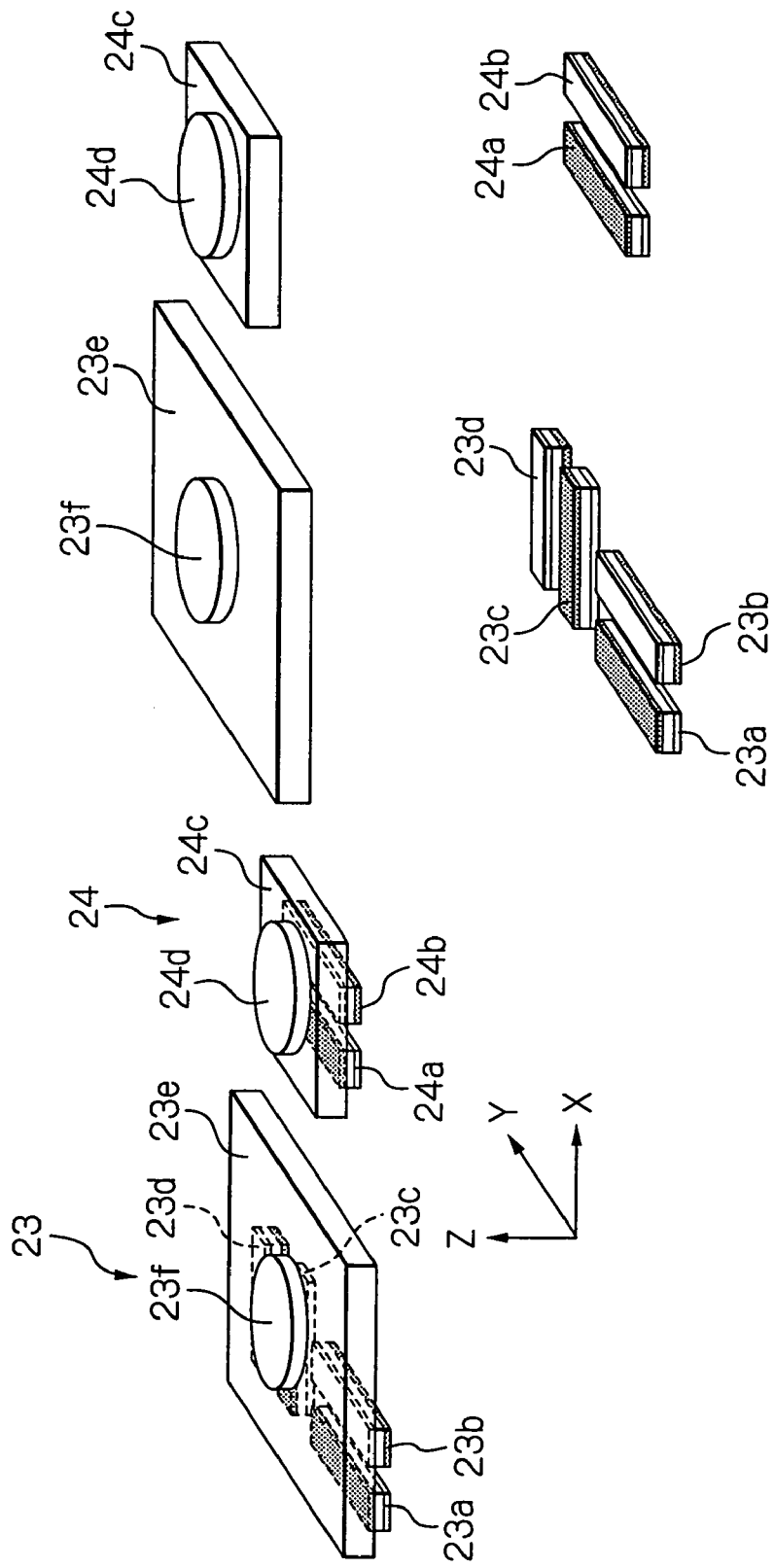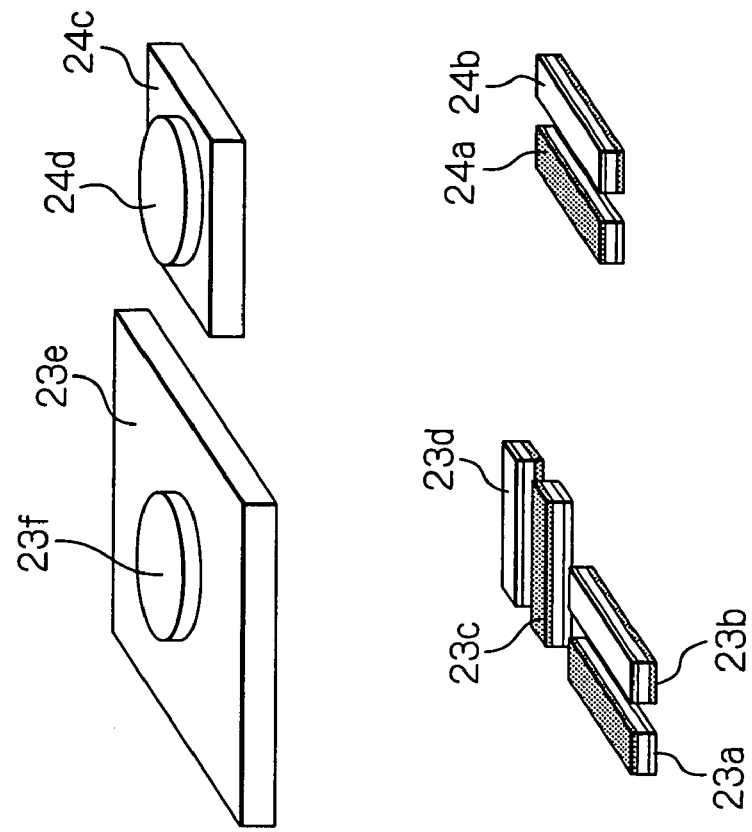

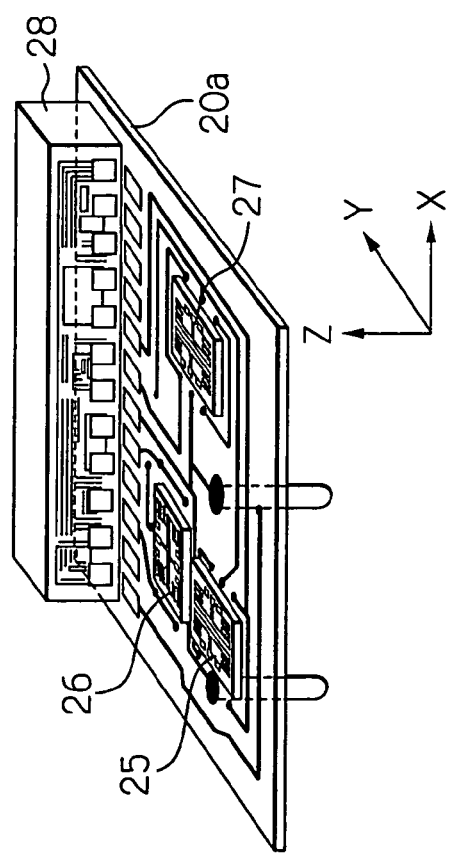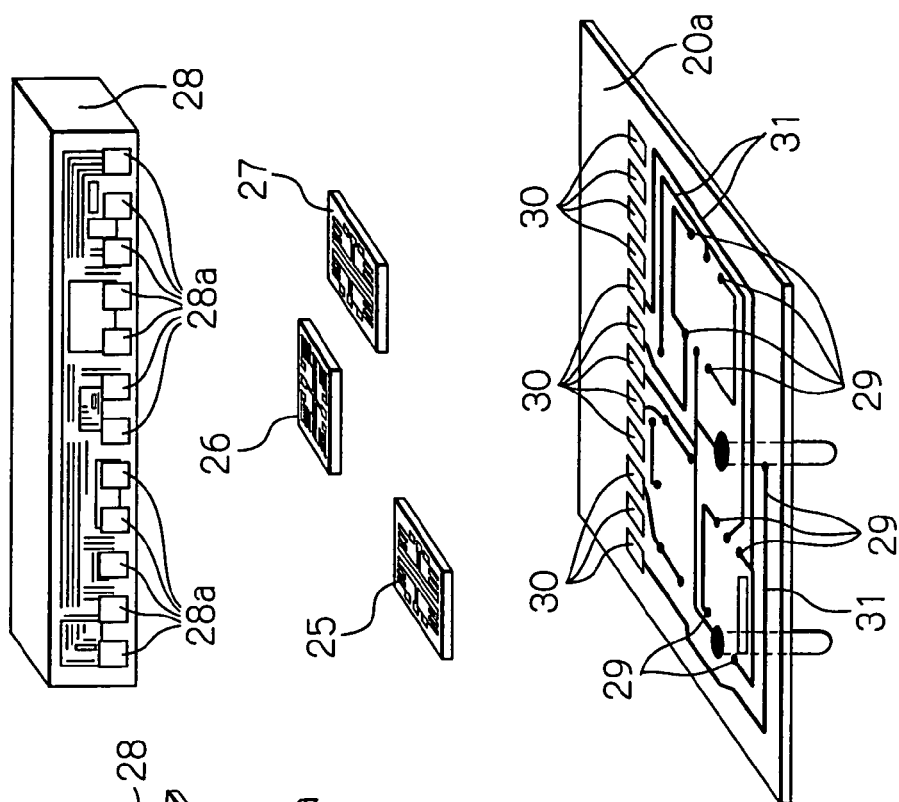

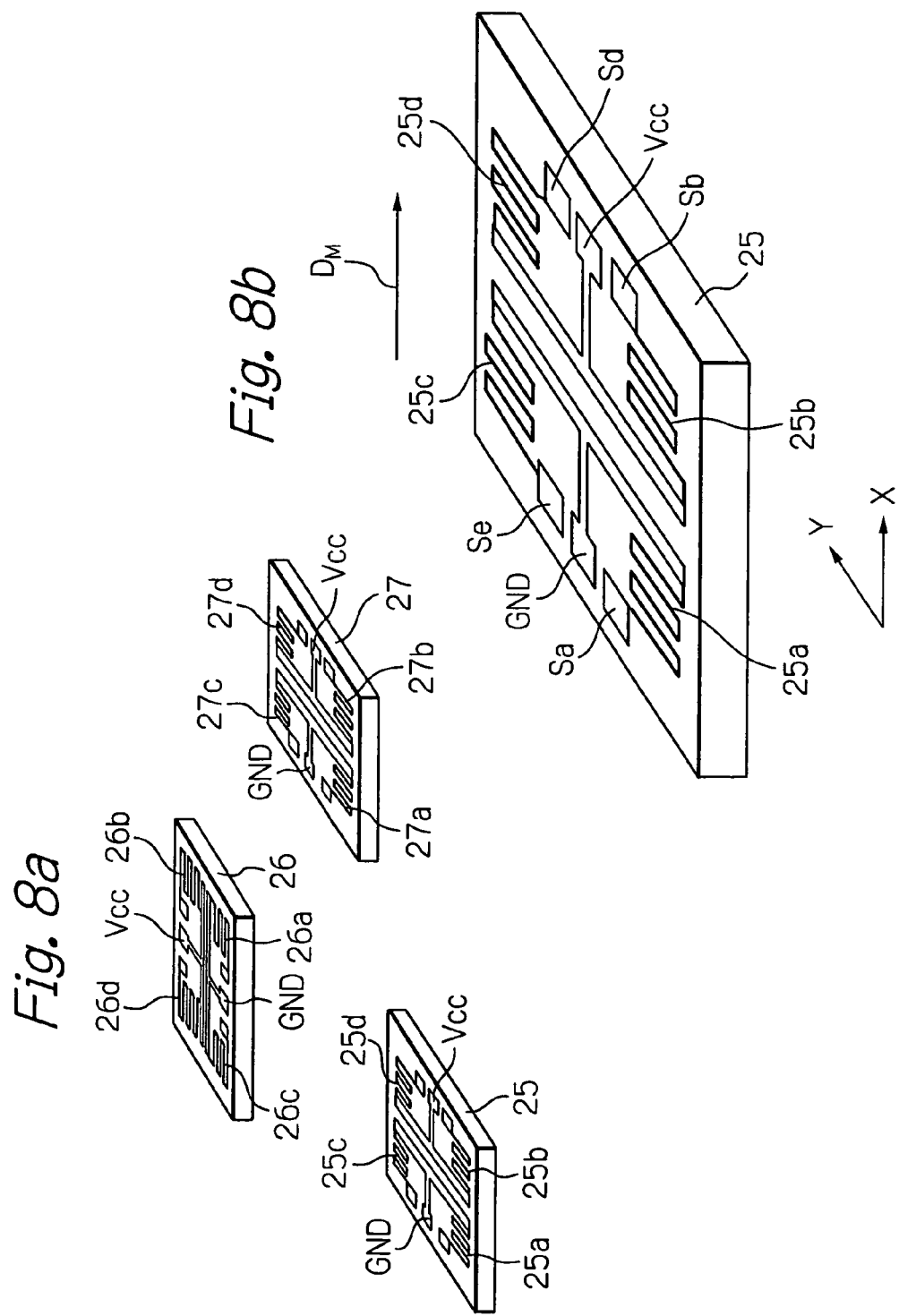

ACCELERATION SENSOR AND MAGNETIC DISK DRIVE APPARATUS

PRIORITY CLAIM

This application claims priority from Japanese patent application No. 2005-211166, filed on Jul. 21, 2005, which is incorporated herein by reference.

BACKGROUND OF THE INVENTION

1. Field of the Invention

The present invention relates to an acceleration sensor with a magnetoresistive effect (MR) element and to a magnetic disk drive apparatus with the acceleration sensor.

2. Description of the Related Art

In a magnetic disk drive apparatus or a hard disk drive (HDD) apparatus assembled in a mobile equipment such as for example a walkabout personal computer, a mobile phone, a digital audio player and other mobile gear, an HDD apparatus used as a mobile storage itself or a removable HDD apparatus, in order to prevent a collision of a magnetic head with a hard disk surface due to drop impact, it is necessary to detect the instant at which the HDD apparatus falls before occurrence of the drop impact and to retract the magnetic head from the hard disk surface. Such instant of the falling can be detected from a slight change in the acceleration of gravity.

Japanese patent publication No. 02-248867A discloses a piezo-electric type acceleration sensor for detecting a small change in the acceleration of gravity from a change in stress of springs. This sensor has springs in dual tuning fork vibrators, a weight supported by the springs, and piezo-electric elements attached on the springs to detect the change in stress applied to the springs from the weight.

U.S. Pat. No. 5,747,991 discloses an electrostatic capacitance type acceleration sensor for detecting a small change in the acceleration of gravity from a displacement of a weight. This sensor has a movable electrode and a static electrode facing each other to detect a change in electrostatic capacitance from a change in distance between the movable and static electrodes due to the acceleration.

Such known piezo-electric type acceleration sensor or electrostatic capacitance type acceleration sensor needs to have electrodes for extracting detection signals there from on the spring or the weight attached to the spring and also lead lines electrically connected to the electrodes. Thus, the structure of the sensor becomes complicated due to the lead lines connected to the electrodes. Also, when the spring and weight are miniaturized, wiring process of such lead lines becomes extremely difficult. Further, the lead lines formed on the miniaturized spring or weight may induce breakage of the lead lines when an excessive value of impact is applied, and prevent movement of the spring to interface with the improvement in sensitivity of the sensor. This tendency becomes more pronounced as the acceleration sensor becomes smaller.

U.S. Pat. No. 6,131,457 discloses an acceleration sensor that may solve the above-mentioned problems in the conventional piezo-electric type acceleration sensor and electrostatic capacitance type acceleration sensor. This acceleration sensor has a magnetic body including a mass point on an axis along a Z-axis, mounted to a vibrator having three-dimensional freedom, and four or more MR detector elements positioned on an X-axis and a Y-axis with their centers located along a perimeter of a concentric circle around the origin point of the orthogonal coordinate axes. The sensor is thus capable of detecting each of acceleration in the direction of X-axis through a relative difference in output voltage between the two detector elements on the X-axis due to a vibration of the magnetic field, acceleration in the direction of Y-axis through a relative difference in output voltage between the two detector elements on the Y-axis due to a vibration of the magnetic field, and acceleration in the direction of Z-axis through a sum total of the output voltages of all the detector elements.

According to the acceleration sensor disclosed in U.S. Pat. No. 6,131,457, as it is not necessary to form electrodes on the spring or the weight, the structure of the sensor becomes simple. However, in such acceleration sensor, with the miniaturization of the magnet, intensity of the magnetic field generated there from weakens, and also with the increase in distance between the magnet and the MR detector element, sensitivity in acceleration detection lowers due to divergence of the magnetic field from the magnet. Furthermore, due to the miniaturization of the magnet and the large leakage of the diverged magnetic field, this acceleration sensor is susceptible to external magnetic filed applied there to, for example, the magnet itself may move in response to the external magnetic filed. Also, using of an anisotropic MR (AMR) element causes lower sensitivity of the magnetic field, so that it is difficult to provide a highly sensitive acceleration sensor.

SUMMARY OF THE INVENTION

It is therefore an object of the present invention to provide an acceleration sensor with an extremely miniaturized size, and to provide a magnetic disk drive apparatus with the acceleration sensor.

Another object of the present invention is to provide an acceleration sensor whereby stable and highly sensitive acceleration detection can be expected even though having an extremely miniaturized structure, and to provide a magnetic disk drive apparatus with the acceleration sensor.

Further object of the present invention is to provide an acceleration sensor whereby precise acceleration detection with high external noise immunity can be expected even though having an extremely miniaturized structure, and to provide a magnetic disk drive apparatus with the acceleration sensor.

According to the present invention, an acceleration sensor includes a housing member, a spring member attached to the housing member and provided with freedom in at least one direction of acceleration to be detected, a magnetic field generation member with weight fixed to the spring member, and at least one magnetic field detection sensor attached to the housing member to face the magnetic field generation member with weight. Each magnetic field detection sensor is provided with at least one pair of multi-layered MR elements each including a magnetization fixed layer and a magnetization free layer. A magnetized direction of the magnetization fixed layers is fixed to a direction parallel to the direction of acceleration to be detected. The magnetic field generation member with weight includes at least one permanent magnet that provides a closed magnetic loop. At least one pair of multi-layered MR elements is arranged in the closed magnetic loop to receive magnetic field substantially perpendicular to a lamination plane of the multi-layered MR elements when no acceleration is applied.

A bias magnetic field is applied to the multi-layered MR element in a direction perpendicular to the lamination plane of the multi-layered MR element from the magnetic field generation member with weight that is fixed to the spring member. Then, inclination of the magnetic field generation member with weight produced by a balance between a rotation moment due to the applied acceleration and a repulsion of the spring member is detected as magnetization vector strength in the direction of the magnetization free layer. Particularly, according to the present invention, because the magnetic field generation member with weight has at least one permanent magnet that provides the closed magnetic loop and at least one pair of multi-layered MR elements are arranged in the closed magnetic loop to receive magnetic field substantially perpendicular to the lamination plane of the multi-layered MR elements when no acceleration is applied, only the minimum amount of magnetic field will leaked to the outside from the closed magnetic loop. Thus, even if the permanent magnet downsizes, insensitivity to possible external magnetic field applied thereto can be expected. Namely, precise acceleration detection with high external noise immunity can be expected even though having an extremely miniaturized structure. Also, because magnetic field is concentrated in the closed magnetic loop and the multi-layered MR elements are located therein, stable and highly sensitive acceleration detection can be expected even though having an extremely miniaturized structure.

Because the magnetization vector is detected by the magnetic field detection sensor provided with at least one multi-layered MR element including a magnetization fixed layer and a magnetization free layer, such as for example a giant magnetoresistive effect (GMR) element or a tunnel magnetoresistive effect (TMR) element, the amount of and the positive and negative of acceleration in each direction to be detected can be sensed by each magnetic field detection sensor. Therefore, the number of the magnetic field detection sensor can be decreased and also the structure of each magnetic field detection sensor can be extremely simplified resulting the total size of the acceleration sensor to extremely miniaturize. Furthermore, because the GMR element or TMR element is quite sensitive in magnetic field change, highly sensitive acceleration detection can be expected.

Furthermore, because it is not necessary to form electrodes on the spring member and the magnetic field generation member with weight, the wiring structure can be simplified. Also, since the bias magnetic field is applied to the magnetic field detection sensor from the magnetic field generation member with weight, this acceleration sensor is insensitive to possible external electrical field and magnetic field applied thereto. In addition, because of a low impedance, the acceleration sensor according to the present invention is relatively unaffected by external disturbance when compared with the piezo-electric type acceleration sensor and the electrostatic capacitance type acceleration sensor.

It is preferred that at least one magnetic field detection sensor includes two magnetic field detection sensors each having at least one pair of multi-layered MR elements, and that the magnetization fixed layers of the multi-layered MR elements in one of the two magnetic field detection sensors are magnetized in a direction perpendicular to the magnetized direction of the magnetization fixed layers of the multi-layered MR elements in the other one of the two magnetic field detection sensors.

It is also preferred that at least one magnetic field detection sensor includes a single magnetic field detection sensor having at least one pair of multi-layered MR elements.

It is further preferred that, in the closed magnetic loop, the magnetic field applied to one of the pair of multi-layered MR elements has a direction opposite to that of the magnetic field applied to the other one of the pair of multi-layered MR elements. Since bias magnetic fields in the directions opposite to each other are applied and the magnetization directions of the pair of multi-layered MR elements are fixed to the same direction, the pair of multi-layered MR elements can be formed in a single chip resulting the acceleration sensor to more downsize.

It is preferred that at least one permanent magnet that provides a closed magnetic loop includes a pair of permanent magnets arranged in parallel to each other so that their surfaces facing the respective magnetic field detection sensors have different magnetic polarities with each other. In this case, it is preferred that at least one pair of multi-layered MR elements are arranged to face the pair of permanent magnets, respectively.

It is also preferred that magnetized directions of all of at least one pair of multi-layered MR elements are the same direction.

It is preferred that the magnetic field generation member with weight is fixed to one surface of the spring member so as to convert acceleration applied thereto into a rotation moment.

It is also preferred that wherein at least one pair of multi-layered MR elements includes at least one linear section running along a direction perpendicular to a magnetization direction in the lamination plane.

It is further preferred that at least one pair of multi-layered MR elements include one pair of multi-layered MR elements connected in a half-bridge configuration, or two pairs of multi-layered MR elements connected in a full-bridge configuration.

It is preferred that the spring member is arranged in parallel to the lamination plane of at least one pair of multi-layered MR element.

It is also preferred that the spring member includes at least two support arm sections capable of twisting and a movable section supported by at least two support arm sections, and that the magnetic field generation member with weight is fixed to the movable section. In this case, it is preferred that at least two support arm sections of the spring member includes four support arms running along a X-axis direction and a Y-axis direction perpendicular to each other, and that one ends of the four support arms are fixed to the housing member and the other ends of the four support arms are coupled to the movable section.

It is preferred that the housing member includes a board and a cover member for covering the board, and that each magnetic field detection sensor is attached to the board. In this case, it is preferred that the board consists of a wiring board including a power supply terminal electrode, a ground terminal electrode, signal output terminal electrodes, and a lead conductor pattern electrically connected to the power supply terminal electrode, to the ground terminal electrode, to the signal output terminal electrodes and to each magnetic field detection sensor. Further, it is preferred that the acceleration sensor further includes an IC chip provided with an amplifier circuit for amplifying outputs from at least one pair of multi-layered MR element and electrically connected to the lead conductor pattern.

It is preferred that the cover member is made of a magnetic material. Thus, the inside of the acceleration sensor is cut off from the external magnetic field to prevent the permanent magnet from moving due to the external magnetic field even if the permanent magnet is extremely miniaturized. As a result, precise acceleration detection can be expected.

It is also preferred that each multi-layered MR element is a GMR element or a TMR element.

According to the present invention, also, an acceleration sensor includes a housing member, a first spring member attached to the housing member and provided with freedom in a X-axis direction and in a Y-axis direction perpendicular to each other, a second spring member attached to the housing member and provided with freedom in a Z-axis direction perpendicular to both the X-axis direction and the Y-axis direction, a first magnetic field generation member with weight fixed to the first spring member, a second magnetic field generation member with weight fixed to the second spring member, first and second magnetic field detection sensors attached to the housing member to face the first magnetic field generation member with weight, and a third magnetic field detection sensor attached to the housing member to face the second magnetic field generation member with weight. Each of the first and second magnetic field detection sensors is provided with at least one pair of multi-layered MR elements each including a magnetization fixed layer and a magnetization free layer, a magnetized direction of the magnetization fixed layers in the first magnetic field detection sensor being fixed to the X-axis direction. A magnetized direction of the magnetization fixed layers in the second magnetic field detection sensor is fixed to the Y-axis direction. The third magnetic field detection sensor is provided with at least one pair of multi-layered MR elements each including a magnetization fixed layer and a magnetization free layer. A magnetized direction of the magnetization fixed layers in the third magnetic field detection sensor is fixed to the X-axis direction or the Y-axis direction. Each of the first and second magnetic field generation members with weight includes at least one permanent magnet that provides a closed magnetic loop. At least one pair of multi-layered MR elements is arranged in the closed magnetic loop to receive magnetic field substantially perpendicular to a lamination plane of the multi-layered MR elements when no acceleration is applied.

Bias magnetic fields are applied to the multi-layered MR elements in a direction perpendicular to the lamination plane of the multi-layered MR elements from the first and second magnetic field generation members with weight fixed to the first and second spring members, respectively. Then, inclinations of the first and second magnetic field generation members with weight produced by balances between rotation moments due to the applied accelerations and repulsions of the first and second spring members are respectively detected as magnetization vector strength in the direction of the magnetization free layers. Particularly, according to the present invention, because each of the first and second magnetic field generation members with weight has at least one permanent magnet that provides the closed magnetic loop and at least one pair of multi-layered MR elements are arranged in the closed magnetic loop to receive magnetic field substantially perpendicular to the lamination plane of the multi-layered MR elements when no acceleration is applied, only the minimum amount of magnetic field will leaked to the outside from the closed magnetic loop. Thus, even if the permanent magnet downsizes, insensitivity to possible external magnetic field applied thereto can be expected. Namely, precise acceleration detection with high external noise immunity can be expected even though having an extremely miniaturized structure. Also, because magnetic field is concentrated in the closed magnetic loop and the multi-layered MR elements are located therein, stable and highly sensitive acceleration detection can be expected even though having an extremely miniaturized structure.

Further, since accelerations in the X-axis direction, the Y-axis direction and the Z-axis direction can be simultaneously detected by this single acceleration sensor, it is possible to easily detect a falling of a magnetic disk drive apparatus with this three-axes acceleration sensor.

Also, because the magnetization vector is detected by the magnetic field detection sensor provided with at least one multi-layered MR element including a magnetization fixed layer and a magnetization free layer, such as for example a GMR element or a TMR element, the amount of and the positive and negative of acceleration in each direction to be detected can be sensed by each magnetic field detection sensor. Therefore, the number of the magnetic field detection sensor can be decreased and also the structure of each magnetic field detection sensor can be extremely simplified resulting the total size of the acceleration sensor to extremely miniaturize. Furthermore, because the GMR element or TMR element is quite sensitive in magnetic field change, highly sensitive acceleration detection can be expected.

Furthermore, because it is not necessary to form electrodes on the spring member and the magnetic field generation member with weight, the wiring structure can be simplified. Also, since the bias magnetic field is applied to the magnetic field detection sensor from the magnetic field generation member with weight, this acceleration sensor is insensitive to possible external electrical field and magnetic field applied thereto. In addition, because of a low impedance, the acceleration sensor according to the present invention is relatively unaffected by external disturbance when compared with the piezo-electric type acceleration sensor and the electrostatic capacitance type acceleration sensor.

It is preferred that, in the closed magnetic loop, the magnetic field applied to one of the pair of multi-layered MR elements has a direction opposite to that of the magnetic field applied to the other one of the pair of multi-layered MR elements. Since bias magnetic fields in the directions opposite to each other are applied and the magnetization directions of the pair of multi-layered MR elements are fixed to the same direction, the pair of multi-layered MR elements can be formed in a single chip resulting the acceleration sensor to more downsize.

It is also preferred that at least one permanent magnet that provides a closed magnetic loop includes a pair of permanent magnets arranged in parallel to each other so that their surfaces facing the respective magnetic field detection sensors have different magnetic polarities with each other. In this case, it is preferred that at least one pair of multi-layered MR elements are arranged to face the pair of permanent magnets, respectively.

It is also preferred that magnetized directions of all of at least one pair of multi-layered MR elements are the same direction.

It is further preferred that the first magnetic field generation member with weight is fixed to one surface of the first spring member so as to convert acceleration applied thereto into a rotation moment, and that the second magnetic field generation member with weight is fixed to one surface of the second spring member so as to convert acceleration applied thereto into a rotation moment.

It is further preferred that at least one pair of multi-layered MR elements includes at least one linear section running along a direction perpendicular to a magnetization direction in the lamination plane.

It is preferred that at least one pair of multi-layered MR elements include one pair of multi-layered MR elements connected in a half-bridge configuration or two pairs of multi-layered MR elements connected in a full-bridge configuration.

It is also preferred that each of the first and second spring members is arranged in parallel to the lamination plane of at least one pair of multi-layered MR element.

It is further preferred that the first spring member includes at least two support arm sections capable of twisting and a movable section supported by at least two support arm sections, the magnetic field generation member with weight being fixed to the movable section. In this case, it is preferred that at least two support arm sections of the spring member includes four support arms running along a X-axis direction and a Y-axis direction perpendicular to each other, and that one ends of the four support arms are fixed to the housing member and the other ends of the four support arms are coupled to the movable section.

It is further preferred that the housing member includes a board and a cover member for covering the board, and that each magnetic field detection sensor is attached to the board. In this case, it is preferred that the board consists of a wiring board including a power supply terminal electrode, a ground terminal electrode, signal output terminal electrodes, and a lead conductor pattern electrically connected to the power supply terminal electrode, to the ground terminal electrode, to the signal output terminal electrodes and to each magnetic field detection sensor. Further, it is preferred that the acceleration sensor further includes an IC chip provided with an amplifier circuit for amplifying outputs from at least one pair of multi-layered MR element and electrically connected to the lead conductor pattern.

It is preferred that the cover member is made of a magnetic material. Thus, the inside of the acceleration sensor is cut off from the external magnetic field to prevent the permanent magnet from moving due to the external magnetic field even if the permanent magnet is extremely miniaturized. As a result, precise acceleration detection can be expected.

It is also preferred that each multi-layered MR element is a GMR element or a TMR element.

According to the present invention, furthermore, a magnetic disk drive apparatus is provided with the aforementioned acceleration sensor.

Further objects and advantages of the present invention will be apparent from the following description of the preferred embodiments of the invention as illustrated in the accompanying drawings.

BRIEF DESCRIPTION OF THE DRAWINGS

FIGS. 6a and 6b are an oblique view and an exploded oblique view schematically illustrating structures of the magnetic field generation members with weight of the acceleration sensor shown in FIG. 2;

FIGS. 7a and 7b are an oblique view and an exploded oblique view schematically illustrating structures of a wiring board, magnetic filed detection sensors and an IC chip of the acceleration sensor shown in FIG. 2;

FIGS. 8a and 8b are an oblique view schematically illustrating structures of the magnetic filed detection sensors of the acceleration sensor shown in FIG. 2 and an enlarged oblique view illustrating one of the sensor chips;

DESCRIPTION OF THE PREFERRED EMBODIMENTS

Figure 1:
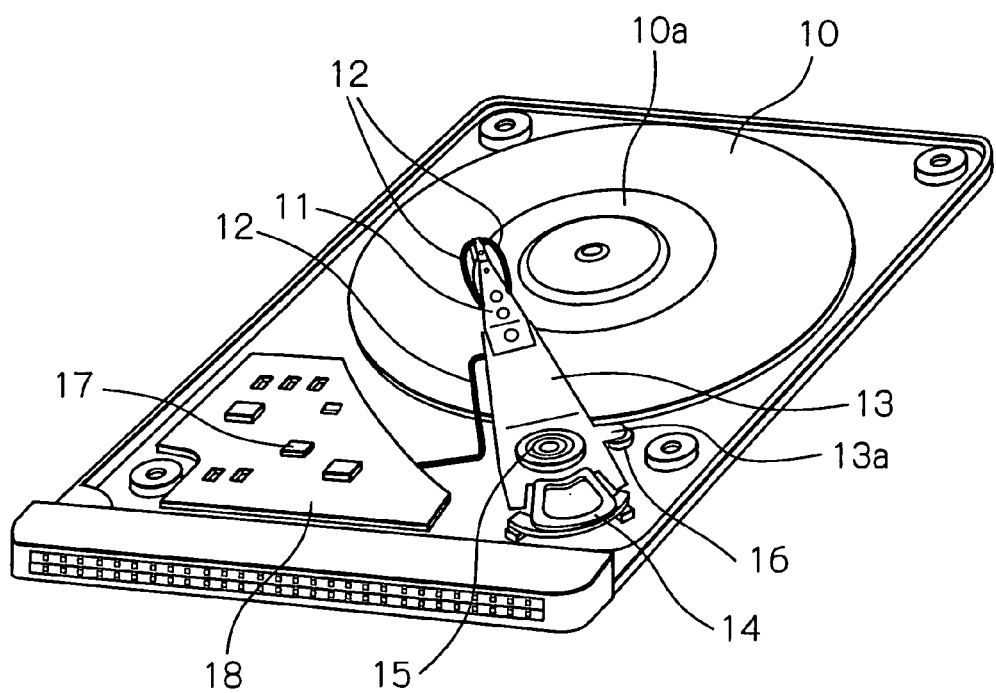
FIG. 1 is an oblique view schematically illustrating a whole structure of an example of a magnetic disk drive apparatus with an acceleration sensor assembled therein.

FIG. 1 schematically illustrates a whole structure of an example of a magnetic disk drive apparatus with an acceleration sensor assembled therein. This magnetic disk drive apparatus is a micro HDD apparatus using at least one magnetic disk of for example 2.5 inches, 1.8 inches, 1.3 inches, or 1.0 or less inches. Such micro HDD apparatus may be an HDD apparatus assembled in mobile equipment such as for example a walkabout personal computer, a mobile phone, a digital audio player or other mobile gear, or an HDD apparatus used itself as a mobile storage or a removable HDD.

In the figure indicating uncovered state of the magnetic disk drive apparatus, reference numeral 10 denotes a magnetic disk rotated by a spindle motor in operation, and 10a denotes a retracted zone of the magnetic disk, with no written data. A magnetic head moves into the retracted zone upon detection of drop of the magnetic disk drive apparatus. In the figure, also, reference numeral 11 denotes a head gimbal assembly (HGA). The magnetic head facing to the magnetic disk 10 in operation is attached at the top end section of this HGA 11. Reference number 12 denotes a flexible printed circuit (FPC) that is a lead conductor member electrically connected to the magnetic head, 13 denotes a support arm for supporting the HGA 11, 14 denotes a voice coil motor (VCM) that is an actuator for positioning the magnetic head by pivoting the support arm 13 about an axis 15, 16 denotes a ramp on which a tab 13a of the support arm 13 is placed to lift the magnetic disk away from the magnetic disk surface upon detection of drop, and 17 denotes an acceleration sensor mounted on a circuit board 18, respectively.

Figure 2:
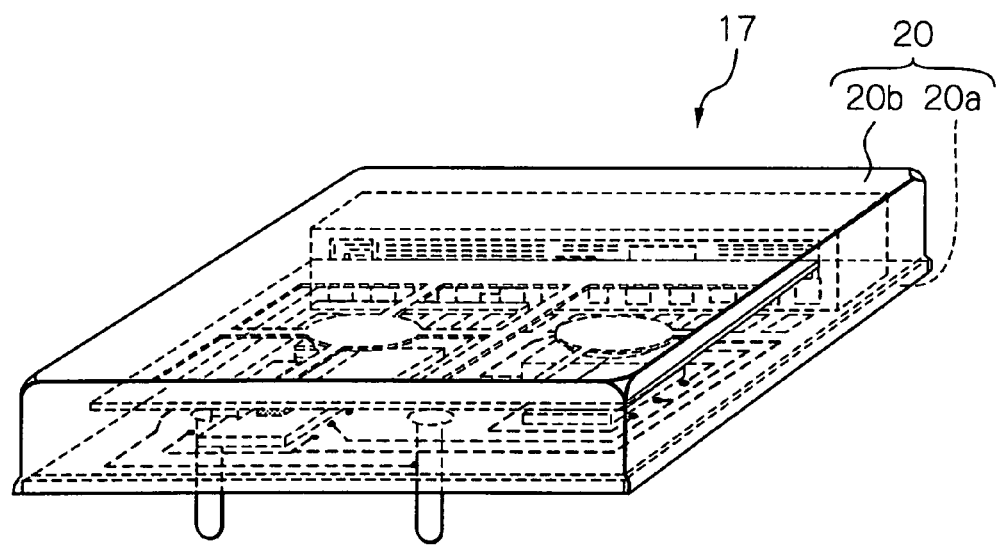
FIG. 2 is an oblique view schematically illustrating an appearance of an acceleration sensor as a preferred embodiment according to the present invention.
Figure 3:
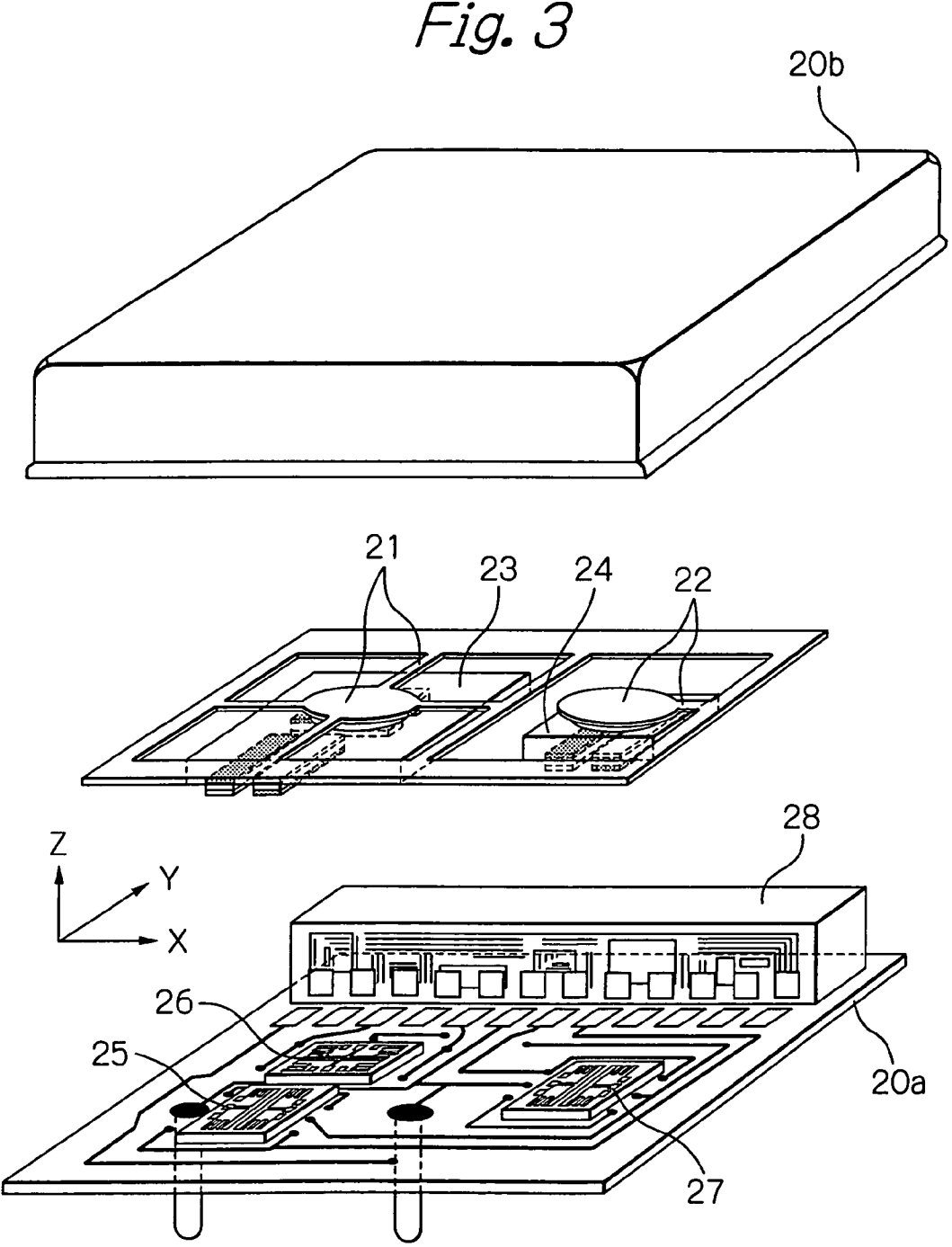
FIG. 3 is an exploded oblique view schematically illustrating a whole structure of the acceleration sensor shown in FIG. 2.
Figure 4:
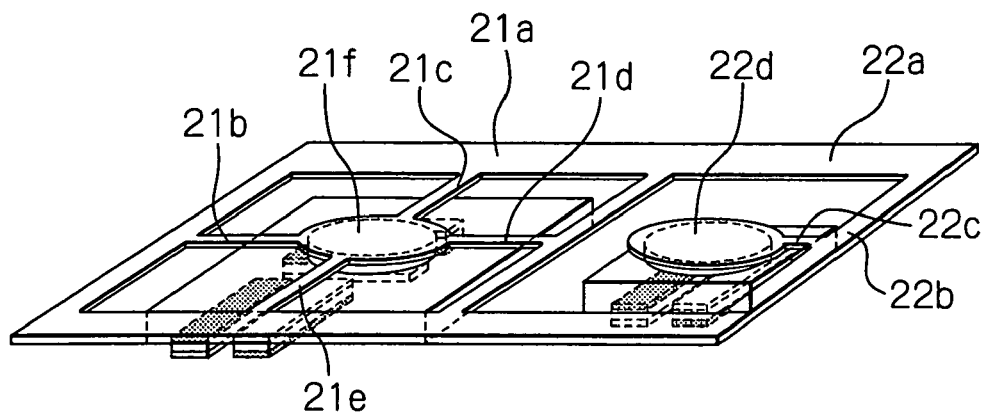
FIG. 4 is an oblique view schematically illustrating structures of spring members and magnetic field generation members with weight of the acceleration sensor shown in FIG. 2.
Figure 5:
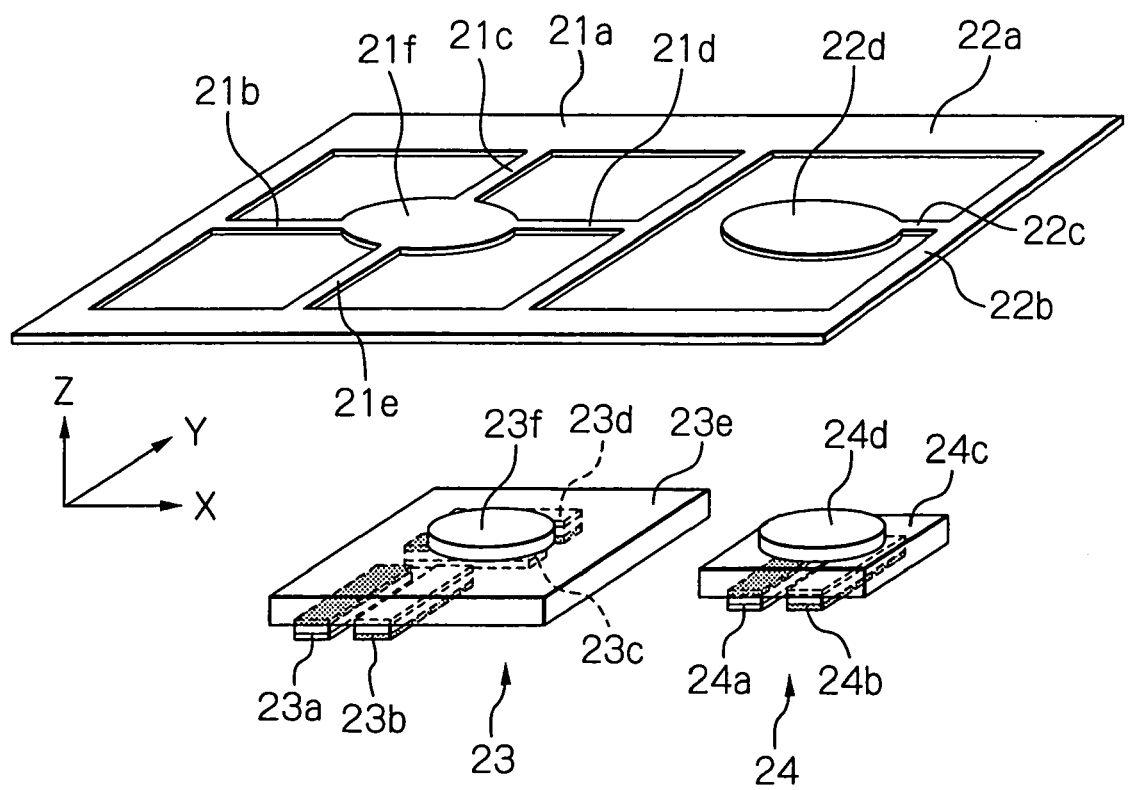
FIG. 5 is an exploded oblique view schematically illustrating structures of the spring members and the magnetic field generation members with weight of the acceleration sensor shown in FIG. 2.

FIG. 2 schematically illustrates an appearance of the acceleration sensor 17 as a preferred embodiment according to the present invention, FIG. 3 schematically illustrating a whole structure of the acceleration sensor, FIG. 4 schematically illustrates structures of spring members and magnetic field generation members with weight of the acceleration sensor, FIG. 5 schematically illustrates structures of the spring members and the magnetic field generation members with weight of the acceleration sensor, and FIGS. 6a and 6b schematically illustrate structures of the magnetic field generation members with weight of the acceleration sensor.

As shown in FIG. 3 in detail, the acceleration sensor in this embodiment is used for detecting accelerations in three axes of X-axis direction, Y-axis direction and Z-axis direction. The acceleration sensor has first and second spring members 21 and 22 integrally formed with each other, first and second magnetic field generation members with weight 23 and 24, a first magnetic field detection sensor 25 for the X-axis direction acceleration, a second magnetic field detection sensor 26 for the Y-axis direction acceleration, a third magnetic field detection sensor 27 for the Z-axis direction acceleration, and an IC chip 28, accommodated in a housing member 20.

The housing member 20 consists of a flat-shaped wiring board 20a made of a resin material such as for example polyimide or BT resin, and a cover member 20b made of a magnetic metal material for covering and for sealing the wiring board 20a. In this embodiment, accelerations along three axes that are in X-axis direction, Y-axis direction and Z-axis direction can be detected by the magnetic field detection sensors mounted on a single plane of the wiring board 20a.

The first and second spring members 21 and 22 are integrally formed from a thin-film metal plate made of for example NiFe, Ni or else, from a thin plate made of for example stainless steel, or from a thin resin plate made of for example polyimide, to have a shape shown in FIG. 5.

More concretely, the first spring member 21 is formed in a shape with a rectangular first outer frame section 21a fixed to the wiring board 20a via a seat or spacer (not shown) or to the cover member 20b and sandwiched between the wiring board 20a and the cover member 20b of the housing member 20, four strip-shaped support arm sections 21b, 21c, 21d and 21e that have one ends integrally coupled with centers of the respective frame edges of the first outer frame section 21a and are capable of twisting, and a movable section 21f located in a center of the first outer frame section 21a and integrally coupled with the other ends of the support arm sections 21b, 21c, 21d and 21e. Thus, the first spring member 21 constitutes a four-direction stretching spring in which the movable section 21f is stretched in four directions. The support arm sections 21b and 21d and the support arm sections 21c and 21e are running along the X-axis and the Y-axis perpendicular to each other, respectively. In this embodiment, the movable section 21f is shaped in a circle. However, in modifications, the movable section 21f may be formed in a rectangular shape or other shape.

The second spring member 22 is formed in a shape with a second outer frame section 22a integrally formed with the first outer frame section 21a, a single strip-shaped support arm section 22c that has one end integrally coupled with a center of a fixing frame edge 22b of the second outer frame section 22a and are capable of bending and stretching, and a movable section 22d located in a center of the second outer frame section 22a and integrally coupled with the other ends of the support arm section 22c. Thus, the second spring member 22 constitutes a cantilever spring in which the movable section 22d is supported at a single point. Although the support arm section 22c is running along the X-axis in this embodiment, it may be running along the Y-axis in modifications. In this embodiment, the movable section 22d is shaped in a circle. However, in modifications, the movable section 22d may be formed in a rectangular shape or other shape.

As shown in FIGS. 4 and 5, the first and second magnetic field generation members with weight 23 and 24 for providing magnetic fields with directions that change in response to the accelerations to the first to third magnetic field detection sensors 25 to 27 are fixed by adhesive to the centers of one surfaces of the movable sections 21f and 22d of the first and second spring members 21 and 22, respectively.

As illustrated in FIGS. 6a and 6b in detail, the first magnetic field generation member with weight 23 has a pair of permanent magnets 23a and 23b for generating magnetic field applied to the first magnetic field detection sensor 25 for the X-axis direction acceleration, a pair of permanent magnets 23c and 23d for generating magnetic field applied to the second magnetic field detection sensor 26 for the Y-axis direction acceleration, a base member 23e, doubling as a weight, to which the permanent magnets 23a to 23d are fixed by adhesive, and a spacer member 23f fixed by adhesive to the base member 23e and used to provide a space between this base member 23e and the support arms of the first spring member 21 so as to prevent interference between them and also bonding of them by the adhesive.

The base member 23e is made of a magnetic metal material such as Al—TiC ($Al_2O_3$—TiC) in this embodiment, and the spacer member 23f is made of a stainless steel in this embodiment. The base member 23e and the spacer member 23f may be made of another material and/or may be integrally formed.

Each of the pair of permanent magnets 23a and 23b is made of a ferrite material and shaped in a rectangular parallelepiped shape extending in parallel with the Y-axis direction. These permanent magnets 23a and 23b are fixed to the base member 23e so as to face the first magnetic field detection sensor 25 for the X-axis direction acceleration. The pair of permanent magnets 23a and 23b are arranged so that their surfaces facing the first magnetic field detection sensor 25 have different magnetic polarities with each other. A closed magnetic loop is formed by these permanent magnets 23a and 23b and the base member 23e. As will be mentioned later, spin valve GMR elements in the first magnetic field detection sensor 25 are arranged within this closed magnetic loop so that a magnetic field or bias field is applied in a direction substantially perpendicular to the lamination plan of these spin valve GMR elements.

Each of the pair of permanent magnets 23c and 23d is made of a ferrite material and shaped in a rectangular parallelepiped shape extending in parallel with the X-axis direction. These permanent magnets 23c and 23d are fixed to the base member 23e so as to face the second magnetic field detection sensor 26 for the Y-axis direction acceleration. The pair of permanent magnets 23c and 23d are arranged so that their surfaces facing the second magnetic field detection sensor 26 have different magnetic polarities with each other. A closed magnetic loop is formed by these permanent magnets 23c and 23d and the base member 23e. As will be mentioned later, spin valve GMR elements in the second magnetic field detection sensor 26 are arranged within this closed magnetic loop so that a magnetic field or bias field is applied in a direction substantially perpendicular to the lamination plan of these spin valve GMR elements.

The second magnetic field generation member with weight 24 has a pair of permanent magnets 24a and 24b for generating magnetic field applied to the third magnetic field detection sensor 27 for the Z-axis direction acceleration, a base member 24c, doubling as a weight, to which the permanent magnets 24a to 24d are fixed by adhesive, and a spacer member 24d fixed by adhesive to the base member 24c and used to provide a space between this base member 24c and the support arms of the second spring member 22 so as to prevent interference between them and also bonding of them by the adhesive.

The base member 24c is made of a magnetic metal material such as Al—TiC ($Al_2O_3$—TiC) in this embodiment, and the spacer member 24d is made of a stainless steel in this embodiment. The base member 24c and the spacer member 24d may be made of another material and/or may be integrally formed.

Each of the pair of permanent magnets 24a and 24b is made of a ferrite material and shaped in a rectangular parallelepiped shape extending in parallel with the Y-axis direction. These permanent magnets 24a and 24b are fixed to the base member 24c so as to face the third magnetic field detection sensor 27 for the Z-axis direction acceleration. The pair of permanent magnets 24a and 24b are arranged so that their surfaces facing the third magnetic field detection sensor 27 have different magnetic polarities with each other. A closed magnetic loop is formed by these permanent magnets 24a and 24b and the base member 24c. As will be mentioned later, spin valve GMR elements in the third magnetic field detection sensor 27 are arranged within this closed magnetic loop so that a magnetic field or bias field is applied in a direction substantially perpendicular to the lamination plan of these spin valve GMR elements.

FIGS. 7a and 7b schematically illustrate structures of the wiring board, the magnetic filed detection sensors and the IC chip of the acceleration sensor shown in FIG. 2, and FIGS. 8a and 8b schematically illustrate structures of the magnetic filed detection sensors of the acceleration sensor shown in FIG. 2 and one of the sensor chips.

As shown in FIGS. 7a and 7b, the first magnetic field detection sensor 25 for detecting acceleration in the X-axis direction, the second magnetic field detection sensor 26 for detecting acceleration in the Y-axis direction, the third magnetic field detection sensor 27 for detecting acceleration in the Z-axis direction, and the IC chip 28 are mounted on the wiring board 20a. Connection pads 29 and 30 wire-bonded or gold-ball-bonded (GBB) to terminal electrodes of these magnetic field detection sensors 25 to 27 and to terminal electrodes 28a of the IC chip 28 respectively are formed on this wiring board 20a.

These connection pads 29 and 30 are electrically connected via lead conductor pattern 31 to a power supply terminal electrode, a ground terminal electrode and signal output terminal electrodes, which are not shown, formed on the wiring board 20a.

As illustrated in detail in FIG. 8b, in the first magnetic field detection sensor 25 for detecting acceleration in the X-axis direction, two pairs of or four spin valve GMR elements 25a, 25b, 25c and 25d are formed in parallel with each other. Each of the spin valve GMR elements 25a to 25d has a linear section extending along a direction (Y-axis direction) perpendicular to the X-axis. The spin valve GMR elements 25a and 25b constitute one pair and, in this embodiment, they are connected in series with each other via signal electrode terminals Sa and Sb at the outside of the first magnetic field detection sensor 25. Both ends of the serially connected elements 25a and 25b are electrically connected to the power supply terminal electrode Vcc and the ground terminal electrode GND, respectively.

The spin valve GMR elements 25c and 25d also constitute one pair and, in this embodiment, they are connected in series with each other via signal electrode terminals Sc and Sd at the outside of the first magnetic field detection sensor 25. Both ends of the serially connected elements 25c and 25d are electrically connected to the power supply terminal electrode Vcc and the ground terminal electrode GND, respectively. Therefore, these spin valve GMR elements 25a, 25b, 25c and 25d are connected in full-bridge configuration.

Each of the spin valve GMR elements 25a, 25b, 25c and 25d has a multi-layered structure mainly consisting of a magnetization fixed layer constituted by a pin layer of an anti-ferromagnetic material and a pinned layer of a ferromagnetic material, a nonmagnetic space layer, and a magnetization free layer (free layer) of a ferromagnetic material. The magnetization of the pinned layer is fixed in a direction perpendicular to a longitudinal direction of the free layer. Namely, in the magnetization of the first magnetic field detection sensor 25 for detecting acceleration in the X-axis direction, all the pinned layers are fixed in the same direction $D_M$ that is the X-axis direction.

The bias magnetic fields respectively applied to the pair of spin valve GMR elements 25a and 25b connected in series with each other are in the directions opposite to each other. Thus, the magnetization directions of the respective pinned layers in these spin valve GMR elements 25a and 25b are fixed to the same direction $D_M$. The bias magnetic fields in the directions opposite to each other are obtained because a closed magnetic loop is formed by the pair of permanent magnets 23a and 23b and the pair of spin valve GMR elements 25a and 25b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 25a and 25b.

To the pair of spin valve GMR elements 25c and 25d connected in series with each other, the same bias magnetic fields in the directions opposite to each other are applied and the magnetization directions of the respective pinned layers in these spin valve GMR elements 25c and 25d are fixed to the same direction.

Since the magnetization directions of the respective pinned layers in the pair of spin valve GMR elements 25a and 25b and the pair of spin valve GMR elements 25c and 25d are fixed to the same direction by applying the opposite direction bias magnetic fields thereto, these four spin valve GMR elements 25a, 25b, 25c and 25d can be formed in a single chip resulting in a smaller sized acceleration sensor.

As illustrated in FIG. 8a, in the second magnetic field detection sensor 26 for detecting acceleration in the Y-axis direction, two pairs of or four spin valve GMR elements 26a, 26b, 26c and 26d are formed in parallel with each other. Each of the spin valve GMR elements 26a to 26d has a linear section running along a direction (X-axis direction) perpendicular to the Y-axis. The spin valve GMR elements 26a and 26b constitute one pair and, in this embodiment, they are connected in series with each other via signal electrode terminals at the outside of the second magnetic field detection sensor 26. Both ends of the serially connected elements 26a and 26b are electrically connected to the power supply terminal electrode Vcc and the ground terminal electrode GND, respectively.

The spin valve GMR elements 26c and 26d also constitute one pair and, in this embodiment, they are connected in series with each other via signal electrode terminals at the outside of the second magnetic field detection sensor 26. Both ends of the serially connected elements 26c and 26d are electrically connected to the power supply terminal electrode Vcc and the ground terminal electrode GND, respectively. Therefore, these spin valve GMR elements 26a, 26b, 26c and 26d are connected in full-bridge configuration.

Each of the spin valve GMR elements 26a, 26b, 26c and 26d has a multi-layered structure mainly consisting of a magnetization fixed layer constituted by a pin layer of an anti-ferromagnetic material and a pinned layer of a ferromagnetic material, a nonmagnetic space layer, and a magnetization free layer (free layer) of a ferromagnetic material. The magnetization of the pinned layer is fixed in a direction perpendicular to a running direction of the free layer. Namely, in the magnetization of the second magnetic field detection sensor 26 for detecting acceleration in the Y-axis direction, all the pinned layers are fixed in the same direction that is the Y-axis direction.

The bias magnetic fields respectively applied to the pair of spin valve GMR elements 26a and 26b connected in series with each other are in the directions opposite to each other. Thus, the magnetization directions of the respective pinned layers in these spin valve GMR elements 26a and 26b are fixed to the same direction. The bias magnetic fields in the directions opposite to each other are obtained because a closed magnetic loop is formed by the pair of permanent magnets 23a and 23b and the pair of spin valve GMR elements 26a and 26b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 26a and 26b.

To the pair of spin valve GMR elements 26c and 26d connected in series with each other, the same bias magnetic fields in the directions opposite to each other are applied and the magnetization directions of the respective pinned layers in these spin valve GMR elements 26c and 26d are fixed to the same direction.

Since the magnetization directions of the respective pinned layers in the pair of spin valve GMR elements 26a and 26b and the pair of spin valve GMR elements 26c and 26d are fixed to the same direction by applying the opposite direction bias magnetic fields thereto, these four spin valve GMR elements 26a, 26b, 26c and 26d can be formed in a single chip resulting the acceleration sensor to more downsize.

As illustrated in FIG. 8a, in the third magnetic field detection sensor 27 for detecting acceleration in the Z-axis direction, two pairs of or four spin valve GMR elements 27a, 27b, 27c and 27d are formed in parallel with each other. Each of the spin valve GMR elements 27a to 27d has a linear section running along a direction (Y-axis direction) perpendicular to the X-axis. The spin valve GMR elements 27a and 27b constitute one pair and, in this embodiment, they are connected in series with each other via signal electrode terminals at the outside of the third magnetic field detection sensor 27. Both ends of the serially connected elements 27a and 27b are electrically connected to the power supply terminal electrode Vcc and the ground terminal electrode GND, respectively.

The spin valve GMR elements 27c and 27d also constitute one pair and, in this embodiment, they are connected in series with each other via signal electrode terminals at the outside of the third magnetic field detection sensor 27. Both ends of the serially connected elements 27c and 27d are electrically connected to the power supply terminal electrode Vcc and the ground terminal electrode GND, respectively. Therefore, these spin valve GMR elements 27a, 27b, 27c and 27d are connected in full-bridge configuration.

Each of the spin valve GMR elements 27a, 27b, 27c and 27d has a multi-layered structure mainly consisting of a magnetization fixed layer constituted by a pin layer of an antiferromagnetic material and a pinned layer of a ferromagnetic material, a nonmagnetic space layer, and a magnetization free layer (free layer) of a ferromagnetic material. The magnetization of the pinned layer is fixed in a direction perpendicular to a running direction of the free layer. Namely, in the magnetization of the third magnetic field detection sensor 27 for detecting acceleration in the Z-axis direction, all the pinned layers are fixed in the same direction that is the X-axis direction.

The bias magnetic fields respectively applied to the pair of spin valve GMR elements 27a and 27b connected in series with each other are in the directions opposite to each other. Thus, the magnetization directions of the respective pinned layers in these spin valve GMR elements 27a and 27b are fixed to the same direction. The bias magnetic fields in the directions opposite to each other are obtained because a closed magnetic loop is formed by the pair of permanent magnets 24a and 24b and the pair of spin valve GMR elements 27a and 27b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 27a and 27b.

To the pair of spin valve GMR elements 27c and 27d connected in series with each other, the same bias magnetic fields in the directions opposite to each other are applied and the magnetization directions of the respective pinned layers in these spin valve GMR elements 27c and 27d are fixed to the same direction.

Since the magnetization directions of the respective pinned layers in the pair of spin valve GMR elements 27a and 27b and the pair of spin valve GMR elements 27c and 27d are fixed to the same direction by applying the opposite direction bias magnetic fields thereto, these four spin valve GMR elements 27a, 27b, 27c and 27d can be formed in a single chip resulting the acceleration sensor to more downsize.

In modifications, the third magnetic field detection sensor 27 for detecting acceleration in the Z-axis direction may have a configuration rotated together with the second spring member 22 and the second magnetic field generation member with weight 24 by 90 degrees in the X-Y plane.

The IC chip 28 is provided with an amplifier circuit for amplifying the differential output signal from the first to third magnetic field detection sensors 25 to 27, and also a multiplexing circuit for providing in time-divisional manner differential output signals corresponding respectively to the X-axis acceleration, the Y-axis acceleration and the Z-axis acceleration through a single signal output terminal.

Figure 9A:
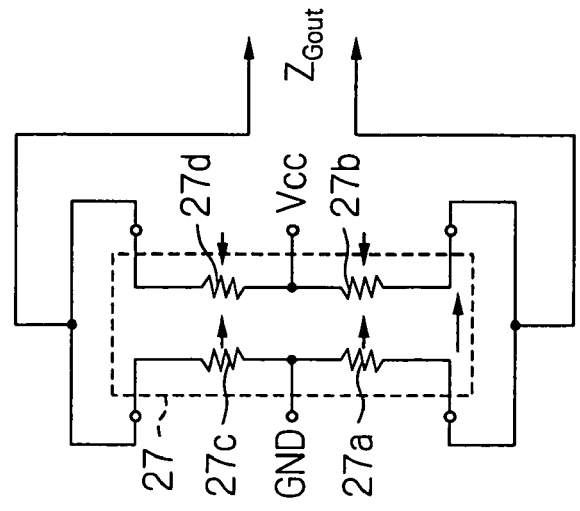
FIGS. 9a, 9b and 9c are circuit diagrams illustrating electrical connection structures of first to third magnetic filed detection sensors of the acceleration sensor shown in FIG. 2.
Figure 9B:
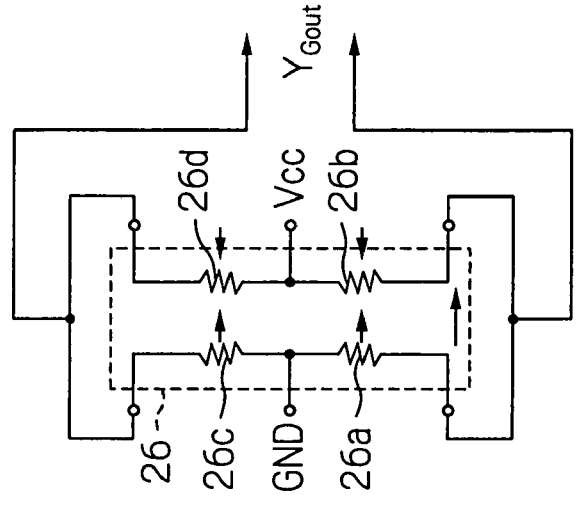
Figure 9C:
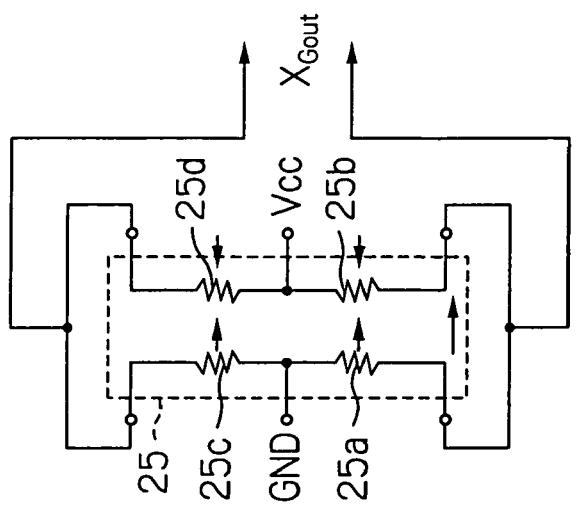

FIGS. 9a, 9b and 9c illustrate electrical connection structures of these first to third magnetic filed detection sensors 25 to 27.

In each magnetic field detection sensor, two pairs of spin valve GMR elements are formed. One ends of one pair of spin valve GMR elements are connected in series to each other at the outside the magnetic field detection sensor and its middle point is connected to the signal output terminal electrode. The other ends of this one pair of spin valve GMR elements are connected to the power supply terminal electrode Vcc and the ground terminal electrode GND, respectively. One ends of the other pair of spin valve GMR elements are connected in series to each other at the outside the magnetic field detection sensor and its middle point is connected to the signal output terminal electrode. The other ends of the other pair of spin valve GMR elements are connected to the power supply terminal electrode Vcc and the ground terminal electrode GND, respectively. Therefore, these four spin valve GMR elements in each magnetic field detection sensor are connected in full-bridge configuration and a differential output signal is derived from the signal output terminal electrodes. In modifications, the pair of the spin valve GMR elements may be connected in series to each other within each magnetic field detection sensor.

Figure 10A:
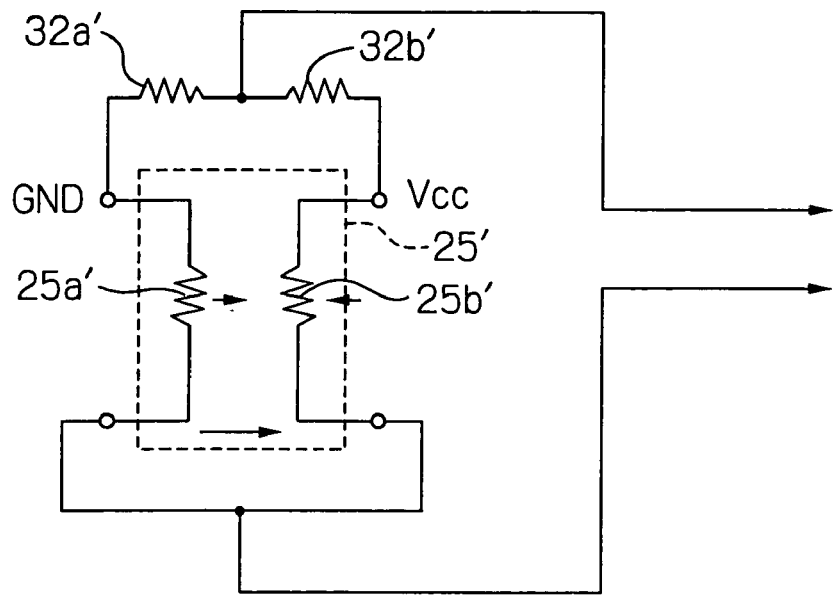
FIGS. 10a and 10b are circuit diagrams illustrating electrical connection structures of magnetic filed detection sensors of acceleration sensors in modifications.
Figure 10B:
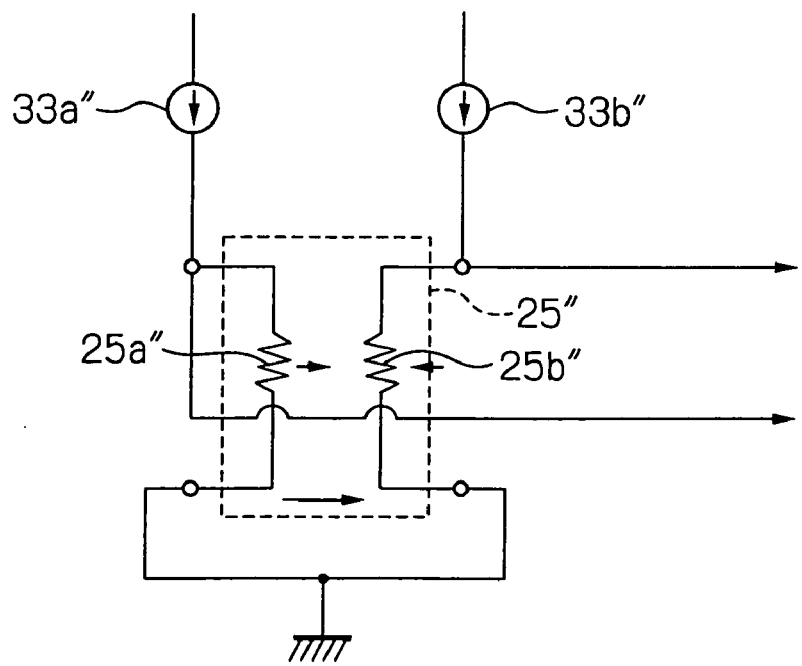

Although each of the first to third magnetic field detection sensors 25 to 27 has two pairs of spin valve GMR elements in this embodiment, each magnetic field detection sensor may have only one pair of spin valve GMR elements in modification. In such modification, as shown in FIG. 10a, one ends of pair of spin valve GMR elements 25a' and 25b' of the magnetic field detection sensor 25' are connected in series to each other at the outside this magnetic field detection sensor 25' and its middle point is connected to one signal output terminal electrode. The other ends of this pair of spin valve GMR elements 25a' and 25b' are connected to the power supply terminal electrode Vcc and the ground terminal electrode GND, respectively. The power supply terminal electrode Vcc and the ground terminal electrode GND are connected in series through external resistors 32a' and 32b' and the middle point between the resistors 32a' and 32b' is connected to the other signal output terminal electrode. Thus an output signal of the half-bridge configuration can be derived from these signal output terminal electrodes. The one ends of the spin valve GMR elements 25a' and 25b' may be connected in series to each other within each magnetic field detection sensor 25'. In further modification, as shown in FIG. 10b, one ends of pair of spin valve GMR elements 25a" and 25b" of the magnetic field detection sensor 25" are connected in series to each other at the outside this magnetic field detection sensor 25" and its middle point is grounded. The other ends of this pair of spin valve GMR elements 25a" and 25b" are connected to constant current sources 33a" and 33b", respectively, and also connected to signal output terminal electrodes. Thus, an output signal of the half-bridge configuration can be derived from these signal output terminal electrodes. The one ends of the spin valve GMR elements 25a" and 25b" may be connected in series to each other within each magnetic field detection sensor 25".

Figure 11:
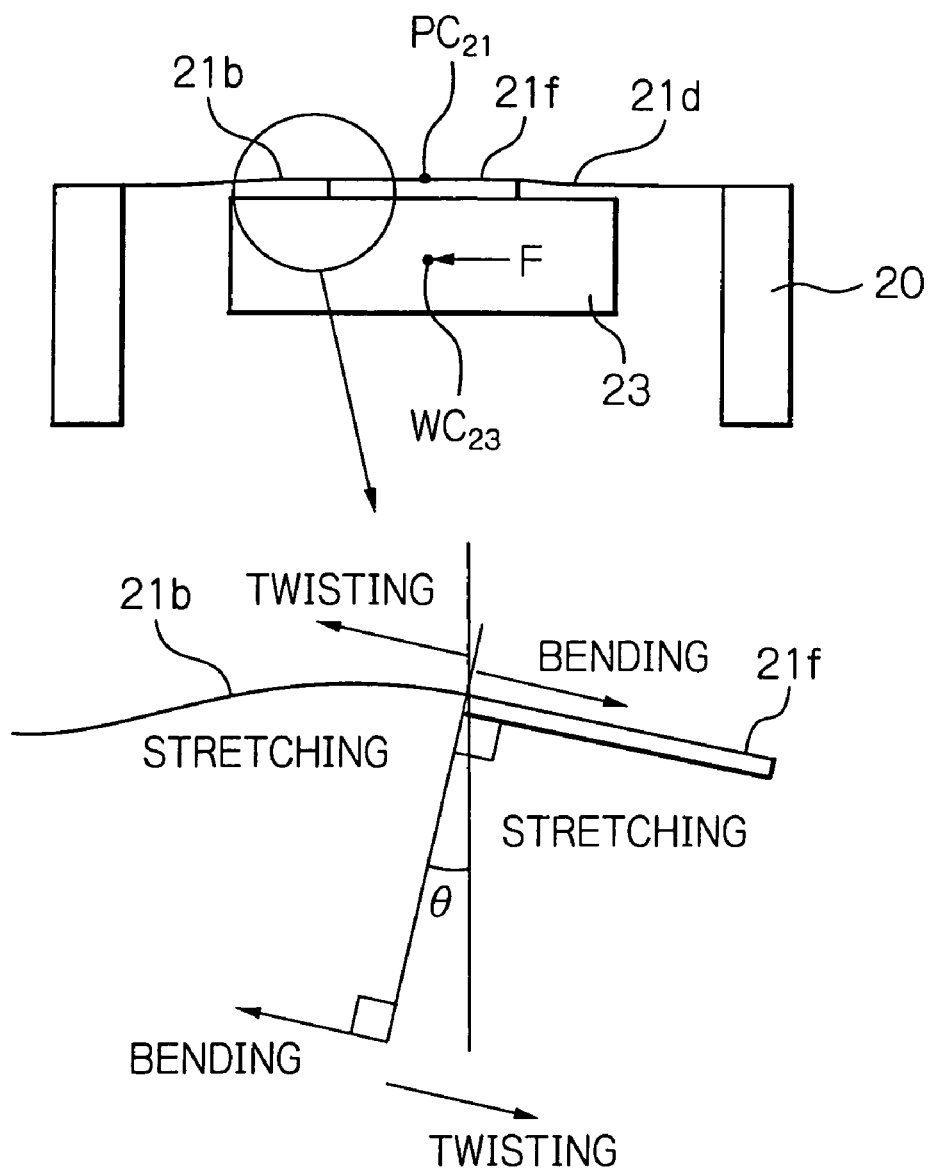
FIG. 11 is a view illustrating operation of the acceleration sensor shown in FIG. 2.

FIG. 11 illustrates operation of the acceleration sensor in this embodiment. Hereinafter, detection of acceleration in the X-axis direction will be described with reference to this figure.

As shown in the figure, because the first magnetic field generation member with weight 23 is fixed on one surface of the movable section 21f of the first spring member 21, the center of gravity or weight center $WC_{23}$ of the first magnetic field generation member with weight 23 deviates from the pivot center $PC_{21}$ of the first spring member 21. Thus, when acceleration F in a lateral direction such as in the X-axis direction is applied, this acceleration F is converted to a moment turning about the support arms 21c and 21e.

This rotation moment and repulsion due to twisting of the support arm sections 21c and 21e and repulsion due to bending and stretching of the support arm sections 21b and 21d are brought into balance. In this case, the repulsion due to twisting is predominant. As a result, the first magnetic field generation member with weight 23 is inclined a small angle θ with respect to the X-axis and therefore the direction of the bias magnetic field changes by the angle θ to the X-axis direction from the perpendicular direction to the lamination plane of the spin valve GMR element.

Because the spin valve GMR element in the first magnetic field detection sensor 25 for detecting acceleration in the X-axis direction is magnetized in the X-axis direction, the GMR element extremely sensitively responds to this small change in angle θ and abruptly changes its MR resistance.

Figure 12:
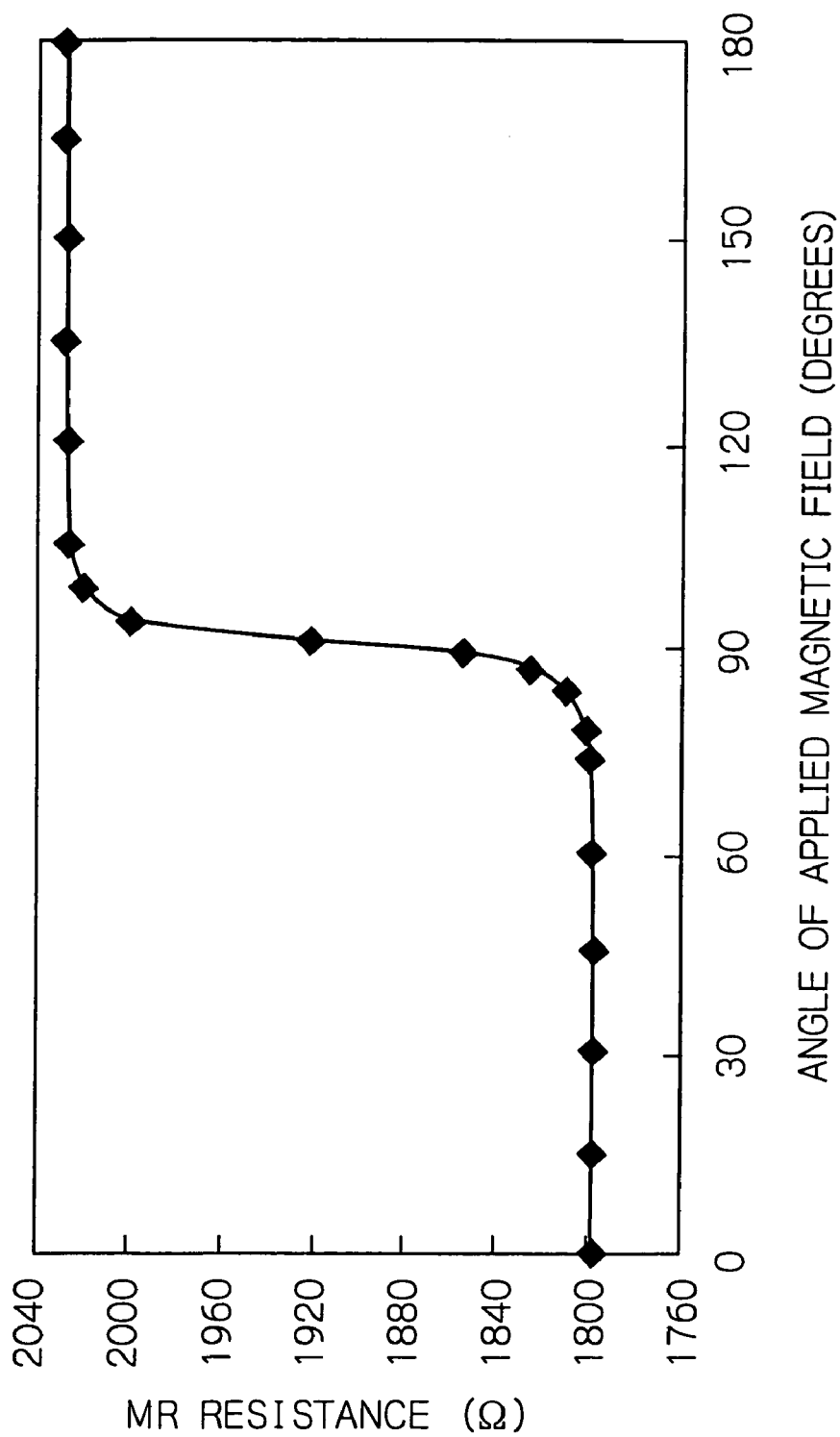
FIG. 12 is a view illustrating characteristics of an MR resistance variation versus an applied magnetic field angle with respect to a lamination plane of a spin valve GMR element.

FIG. 12 illustrates characteristics of the MR resistance variation versus the applied magnetic field angle with respect to the lamination plane of the spin valve GMR element. In the figure, the lateral axis represents an angle (degrees) between the applied magnetic field or the bias magnetic field and the direction along which the free layer runs, that is a direction perpendicular to the magnetization direction, and the longitudinal axis represents an MR resistance (Ω).

As will be noted from the figure, the MR resistance of the spin valve GMR element will greatly change depending upon a slight change near 90 degrees of angle in the bias magnetic field. Because the small angle change θ of the bias magnetic field to the X-axis corresponds to 90 degrees±θ, the small inclination of the first magnetic field generation member with weight 23, that is, the permanent magnets 23a and 23b is extracted as a change in MR resistance. This change in MR resistance indicates not only the amount of angle change but also positive and negative directions of angle change.

Similar to this, detection of acceleration in the Y-axis direction is performed by the permanent magnets 23c and 23d of the first magnetic field generation member with weight 23 and by the second magnetic field sensor chip 26.

Because the second magnetic field generation member with weight 24 is fixed on the movable section 22d of the second spring member 22 and this movable section 22d is supported by the support arm section 22c as a cantilevering manner, the center of gravity or weight center of the second magnetic field generation member with weight 24 deviates from the pivot center of the second spring member 22. Therefore, when the acceleration in a longitudinal direction such as in the Z-axis direction is applied, this acceleration is converted to a moment turning about the base of the cantilevered support arm 21c with respect to the fixing frame edge 22b.

This rotation moment and repulsion due to bending and stretching of the support arm section 22c are brought into balance. In this case, the repulsion due to twisting is predominant. As a result, the second magnetic field generation member with weight 24 is inclined a small angle θ with respect to the X-axis and therefore the direction of the bias magnetic field changes by the angle θ to the X-axis direction from the perpendicular direction to the lamination plane of the spin valve GMR element.

Because the spin valve GMR element in the third magnetic field detection sensor 27 for detecting acceleration in the Z-axis direction is magnetized in the X-axis direction, the GMR element extremely sensitively responds to this small change in angle θ and abruptly changes its MR resistance.

As a result, the amount of and the positive and negative of acceleration in each direction to be detected, that is in each of the X-axis, Y-axis and Z-axis directions, can be sensed by each of the magnetic field detection sensors 25 to 27. Therefore, the number of the magnetic field detection sensors can be decreased and also the structure of each sensor chip can be extremely simplified resulting the total size of the acceleration sensor to extremely miniaturize. Furthermore, because the spin valve GMR element is quite sensitive in magnetic field change, highly sensitive acceleration detection can be expected.

Figure 13:
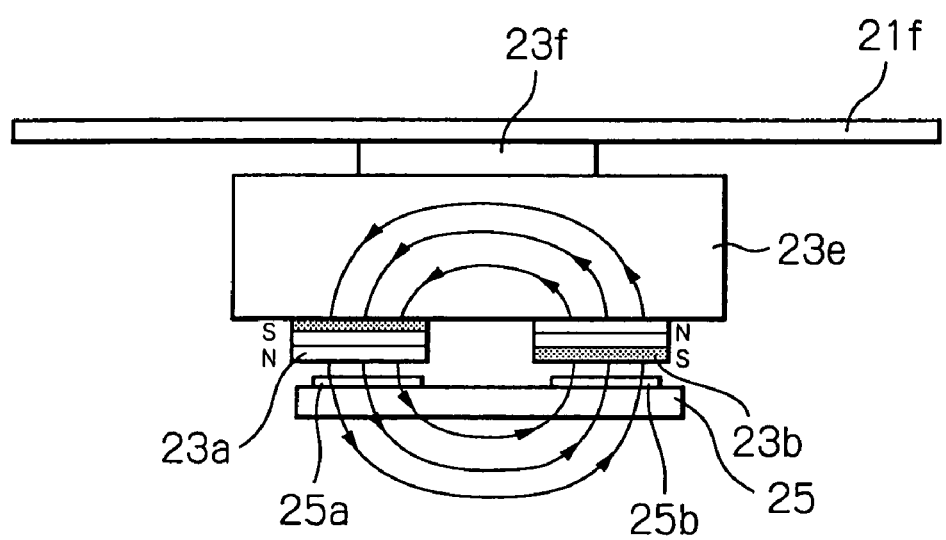
FIG. 13 is a side view illustrating the relative positioning of the magnetic field generation member with weight and the magnetic filed detection sensor of the acceleration sensor shown in FIG. 2.

FIG. 13 illustrates the relative positioning of the magnetic field generation member with weight and the magnetic filed detection sensor of the acceleration sensor. In the figure, the first magnetic field generation member with weight 23 and the first magnetic filed detection sensor 25 are illustrated as an example. Hereinafter, the important point of the present invention will be described.

As will be understood from this figure, the first magnetic field generation member with weight 23 has one pair of the permanent magnets 23a and 23b with opposite magnetic polarities to each other on its surface that faces the first magnetic filed detection sensor 25, so as to provide a closed magnetic loop. The pair of spin valve GMR elements 25a and 25b of the first magnetic field detection sensor 25 are arranged just under these permanent magnets 23a and 23b to face them. Therefore, the pair of spin valve GMR elements 25a and 25b are positioned within the closed magnetic loop so as to respectively receive bias magnetic fields in opposite directions to each other and perpendicular to the lamination plane when no acceleration is applied. Sine the bias magnetic fields applied to the spin valve GMR element 25a and the spin valve GMR element 25b are in the directions opposite to each other, the magnetization directions of the respective pinned layers in these spin valve GMR elements 25a and 25b are fixed to the same direction even when they are connected in series with each other to form the bridge configuration. Thus, the pair of spin valve GMR elements can be formed in a single chip resulting the acceleration sensor to more downsize.

Figure 14B:
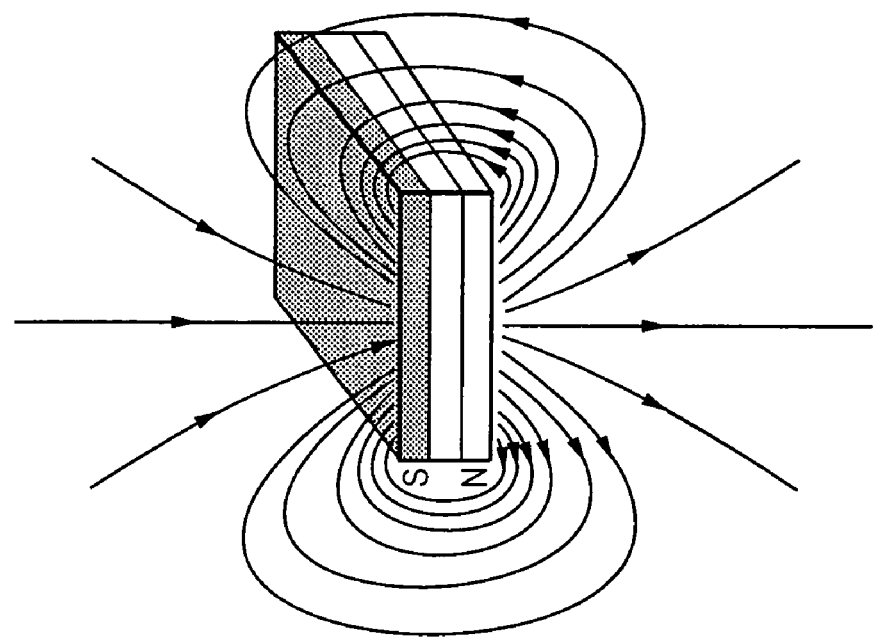
FIGS. 14a and 14b are views illustrating a difference between magnetic fields generated by two permanent magnets and a single permanent magnet.
Figure 14A:
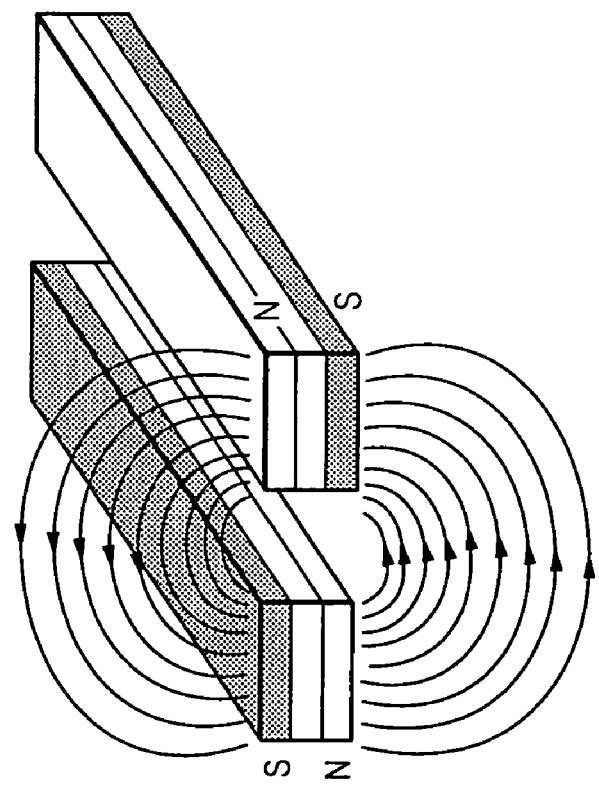

According to this embodiment, as shown in FIG. 14a, because the pair of two permanent magnets provide the closed magnetic loop with widely spread magnetic field in the direction perpendicular to the lamination plane of the spin valve GMR element and the spin valve GMR element is arranged in this closed magnetic loop, only the minimum amount of magnetic field will leaked to the outside from the closed magnetic loop, that is the leakage of magnetic field will decrease, and enough bias magnetic filed will be applied to the spin valve GMR element. Therefore, even if the permanent magnet downsizes, stable and high sensitivity in acceleration detection can be obtained and also insensitivity to possible external electrical field and external magnetic field applied thereto can be expected. Contrary to this, according to the conventional art, as shown in FIG. 14b, because a single permanent magnet is merely used, the magnetic field is dispersed with distance from the permanent magnet and thus a range of magnetic field provided in a direction perpendicular to the spin valve GMR element is narrow. Therefore, it is quite difficult to supply enough bias magnetic filed to the spin valve GMR element causing a low sensitivity in acceleration detection.

According to this embodiment, further, because it is not necessary to form electrodes on the spring members and the magnetic field generation members with weight, the wiring structure can be simplified. Also, because of a low impedance, the acceleration sensor of this embodiment is relatively unaffected by external disturbance when compared with the piezo-electric type acceleration sensor and the electrostatic capacitance type acceleration sensor.

In the aforementioned embodiment, the closed magnetic loop is formed by two permanent magnets with opposite magnetic polarities to each other on their surfaces that face the magnetic filed detection sensor. However, such closed magnetic field can be formed by combining a single permanent magnet with a yoke made of for example a soft magnetic material.

Furthermore, although the IC chip is mounted in the housing of the acceleration sensor in the aforementioned embodiment, such IC chip may be separately mounted from the acceleration sensor in modifications. Also, in the aforementioned embodiment, the acceleration sensor is configured to detect three-axis accelerations of the X-axis direction, the Y-axis direction and the Z-axis direction. In modifications, the acceleration sensor may be configured to detect one-axis acceleration or two-axis accelerations in the X-axis direction, the Y-axis direction and the Z-axis direction.

As for the magnetic field detection element, a TMR element may be used instead of the spin valve GMR element.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An acceleration sensor comprising:
a housing member;
a spring member attached to said housing member, said spring member having freedom in at least one direction of acceleration to be detected;
a magnetic field generation member with weight fixed to said spring member; and
at least one magnetic field detection sensor attached to said housing member to face said magnetic field generation member with weight,
each magnetic field detection sensor being provided with at least one pair of multi-layered magnetoresistive effect elements each including a magnetization fixed layer and a magnetization free layer, a magnetized direction of said magnetization fixed layers being fixed to a direction parallel to the direction of acceleration to be detected,
said magnetic field generation member with weight including at least one permanent magnet that provides a closed magnetic loop, said at least one pair of multi-layered magnetoresistive effect elements being arranged in the closed magnetic loop to receive magnetic field substantially perpendicular to a lamination plane of the multi-layered magnetoresistive effect elements when no acceleration is applied,
wherein said at least one permanent magnet that provides a closed magnetic loop comprises a pair of permanent magnets arranged in parallel to each other so that their surfaces facing the respective magnetic field detection sensors have different magnetic polarities with each other.

2. The acceleration sensor as claimed in claim 1, wherein said at least one magnetic field detection sensor comprises two magnetic field detection sensors each having at least one pair of multi-layered magnetoresistive effect elements, and wherein the magnetization fixed layers of the multi-layered magnetoresistive effect elements in one of said two magnetic field detection sensors are magnetized in a direction perpendicular to the magnetized direction of the magnetization fixed layers of the multi-layered magnetoresistive effect elements in the other one of said two magnetic field detection sensors.

3. The acceleration sensor as claimed in claim 1, wherein said at least one magnetic field detection sensor comprises a single magnetic field detection sensor having at least one pair of multi-layered magnetoresistive effect elements.

4. The acceleration sensor as claimed in claim 1, wherein, in said closed magnetic loop, the magnetic field applied to one of the pair of multi-layered magnetoresistive effect elements has a direction opposite to that of the magnetic field applied to the other one of the pair of multi-layered magnetoresistive effect elements.

5. The acceleration sensor as claimed in claim 1, wherein said at least one pair of multi-layered magnetoresistive effect elements are arranged to face said pair of permanent magnets, respectively.

6. The acceleration sensor as claimed in claim 1, wherein magnetized directions of all of said at least one pair of multi-layered magnetoresistive effect elements are the same direction.

7. The acceleration sensor as claimed in claim 1, wherein said magnetic field generation member with weight is fixed to one surface of said spring member so as to convert acceleration applied thereto into a rotation moment.

8. The acceleration sensor as claimed in claim 1, wherein said at least one pair of multi-layered magnetoresistive effect elements comprise at least one linear section running along a direction perpendicular to a magnetization direction in said lamination plane.

9. The acceleration sensor as claimed in claim 1, wherein said at least one pair of multi-layered magnetoresistive effect elements comprise one pair of multi-layered magnetoresistive effect elements connected in a half-bridge configuration.

10. The acceleration sensor as claimed in claim 1, wherein said at least one pair of multi-layered magnetoresistive effect elements comprise two pairs of multi-layered magnetoresistive effect elements connected in a full-bridge configuration.

11. The acceleration sensor as claimed in claim 1, wherein said spring member is arranged in parallel to the lamination plane of said at least one pair of multi-layered magnetoresistive effect element.

12. The acceleration sensor as claimed in claim 11, wherein said spring member includes at least two support arm sections capable of twisting and a movable section supported by said at least two support arm sections, said magnetic field generation member with weight being fixed to said movable section.

13. The acceleration sensor as claimed in claim 12, wherein said at least two support arm sections of said spring member includes four support arms running along a X-axis direction and a Y-axis direction perpendicular to each other, and wherein one ends of said four support arms are fixed to said housing member and the other ends of said four support arms are coupled to said movable section.

14. The acceleration sensor as claimed in claim 1, wherein said housing member comprises a board and a cover member for covering said board, and wherein each magnetic field detection sensor is attached to said board.

15. The acceleration sensor as claimed in claim 14, wherein said board consists of a wiring board comprising a power supply terminal electrode, a ground terminal electrode, signal output terminal electrodes, and a lead conductor pattern electrically connected to said power supply terminal electrode, to said ground terminal electrode, to said signal output terminal electrodes and to each magnetic field detection sensor.

16. The acceleration sensor as claimed in claim 15, wherein said acceleration sensor further comprises an IC chip provided with an amplifier circuit for amplifying outputs from said at least one pair of multi-layered magnetoresistive effect element and electrically connected to said lead conductor pattern.

17. The acceleration sensor as claimed in claim 14, wherein said cover member is made of a magnetic material.

18. The acceleration sensor as claimed in claim 1, wherein each multi-layered magnetoresistive effect element is a giant magnetoresistive effect element or a tunnel magnetoresistive effect element.

19. A magnetic disk drive apparatus provided with an acceleration sensor comprising:
a housing member;
a spring member attached to said housing member, said spring member having freedom in at least one direction of acceleration to be detected;
a magnetic field generation member with weight fixed to said spring member; and
at least one magnetic field detection sensor attached to said housing member to face said magnetic field generation member with weight,
each magnetic field detection sensor being provided with at least one pair of multi-layered magnetoresistive effect elements each including a magnetization fixed layer and a magnetization free layer, a magnetized direction of said magnetization fixed layers being fixed to a direction parallel to the direction of acceleration to be detected,
said magnetic field generation member with weight including at least one permanent magnet that provides a closed magnetic loop, said at least one pair of multi-layered magnetoresistive effect elements being arranged in the closed magnetic loop to receive magnetic field substantially perpendicular to a lamination plane of the multi-layered magnetoresistive effect elements when no acceleration is applied,
wherein said at least one permanent magnet that provides a closed magnetic loop comprises a pair of permanent magnets arranged in parallel to each other so that their surfaces facing the respective magnetic field detection sensors have different magnetic polarities with each other.

* * * * *